Oct. 21, 1969 F. F. TSUI 3,474,424

MAGNETIC ASSOCIATIVE SEMI-PERMANENT MEMORY SYSTEM

Filed June 9, 1966 4 Sheets-Sheet 1

INVENTOR

FRANK F. TSUI

BY Philip M. Bolton

ATTORNEY

MAGNETIC ASSOCIATIVE SEMI-PERMANENT MEMORY SYSTEM

Filed June 9, 1966 4 Sheets-Sheet 2

INVENTOR
FRANK F. TSUI
BY Philip M. Bolton
ATTORNEY

MAGNETIC ASSOCIATIVE SEMI-PERMANENT MEMORY SYSTEM

Filed June 9, 1966 4 Sheets-Sheet 3

INVENTOR
FRANK F. TSUI
BY Philip M. Bolton
ATTORNEY

INVENTOR
FRANK F. TSUI
BY Philip M. Bolton
ATTORNEY 3,474,424
Patented Oct. 21, 1969

3,474,424

MAGNETIC ASSOCIATIVE SEMI-PERMANENT MEMORY SYSTEM

Frank Fang Tsui, Boblingen, Germany, assignor to International Standard Electric Corporation, New York, N.Y., a corporation of Delaware Filed June 9, 1966, Ser. No. 556,360
Claims priority, application Germany, June 15, 1965, St 23,983
Int. Cl. G11b *5/00*
U.S. Cl. 340—174 2 Claims

ABSTRACT OF THE DISCLOSURE

A magnetic semi-permanent memory forming an associative permanent memory. The information is accommodated on two-layer paths carrying printed circuits which are punched so that magnetic rods, depending on the bit value in the one plane, either do or do not surround in the other plane. The cards contain an association portion and a data portion, interrogation windings are coupled to the association portion, and read windings are coupled to the data portion. The arrangement is dimensioned so that a current only flows in the loop of the association portion including the interrogation information, and the information is read out in the data portion.

Figure 1:
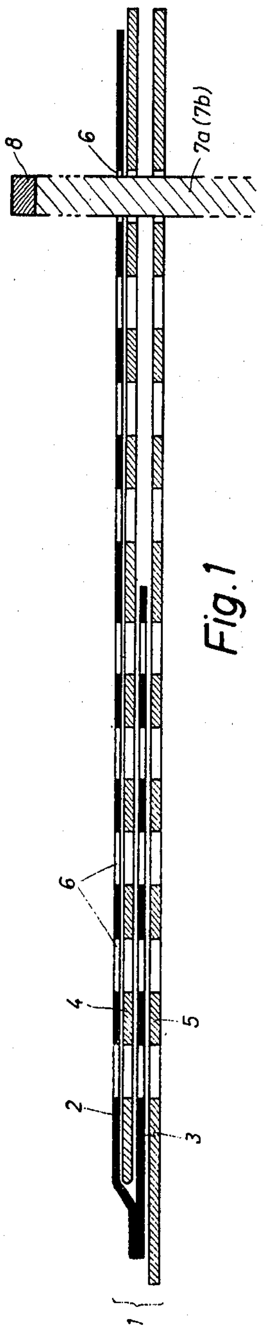

The present invention relates to a magnetic associative semi-permanent memory system.

As a rule, the words as stored in an associative memory of the tag type, consist of an association portion (P) and of a data portion (Q). Upon interrogation of the memory the bit positions in the association portion are compared to the corresponding bits of the interrogation criterion. If the association portion of a word is in agreement with the interrogation criterion, then the data portion of this word may be read out or overprinted. Hence, unlike in conventional memories, the storage cells in the associative memory, an account of the information stored therein, are accessible without the aid of an explicit address assignment.

By the term semi-permanent memory there is understood a memory in which the stored information cannot be changed electronically, but only with the aid of mechanical measures.

Magnetic associative memories as well as magnetic semi-permament memories are already known to the art. As examples relating to the magnetic associative memories reference is made to the article by Kiseda et al. as published in the IBM Journal, April 1961, pp. 106–121, and with respect to the semi-permanent memories reference is made to the German printed application (DAS) 1,174,836.

The magnetic semi-permanent memory, as disclosed by the German printed application (DAS) 1,174,836, uses cards as a storing medium, consisting of punchable foils of insulating material carrying printed circuit conductors. By way of punching, the circuit conductors are shaped into word loops which, at the bit positions, will then either include the hole or aperture (for 1) which is provided for a ferrite rod to be inserted therethrough later on, or extend past the apertures (for 0). For each binary digit to be stored there is provided a ring line around the aperture. The individual ring lines associated with one word, are connected in series and, together with a return lead, constitute a word loop through which a current is sent upon selecting the respective word. During the punching there is optionally interrupted either the one or the other half of the ring line so that at the respective bit position, the word loop is then either coupled or noncoupled to the ferrite rod as extending through the aperture. After the punching, the cards are piled together. Through these apertures in the cards there are then inserted ferrite rods carrying windings, to which there are added ferrite yoke pieces for the purpose of constituting closed magnetic flux paths. Upon selection, the word loops in the storage or memory cards are individually sensed, and the windings on the ferrite rods will furnish the read signals.

It is the object of the present invention to improve the construction principle of this conventional type of magnetic semi-permanent memory in such a way that there is enabled the construction of an associative magnetic semi-permanent memory system.

The invention relates to a magnetic associative semi-permanent memory in which each word consists of an association portion having *m* bit positions, and of a data portion having *n* bit positions, and in which in the data portion, the value 1 or 0 of each binary position is indicated by either the presence or absence of an inductive coupling between a first (primary) and a second (secondary) winding, with the first winding being constituted by metal strips on a punchable storage or memory card and consists of an interconnection of the ring lines enclosing each time one hole or aperture, and of a return lead, with the individual ring-lines, when used for storage, are punched in such a way that the loop portion reshaped in the course of this and, with respect to one bit position, consisting of an interrupted ring-line and of the return lead, either encloses or surrounds the aperture associated with the bit position or is led past this aperture, and with the second winding being a cylindrical coil inserted through the aperture and representing the sensing line provided in common to the corresponding bits of all words, and in which, in the data portion, the loop parts (ring-lines and return leads) of all bits, being series connected, constitute a line loop (looped circuit).

The invention is characterized by the fact that the association portion consists of two partial loops or two superposed foil layers which are built up in a similar way as the foil layers of the data portion, and that said two partial loops are so conducted, and that they are interconnected in such a way that the loop portion resulting subsequently to the punching, in the one plane when storing a 1 and, in the other plane, when storing a 0, will enclose or surround the aperture (hole) and, in the opposite case, will extend past this aperture, and that the total loop at the individual bit positions, when storing a 1 is coupled in the one sense or direction and, when storing a 0, in the opposite sense or direction to the cylindrical coil as inserted through the aperture, and that the cylindrical coils in the association portion serve as selection windings extending through the association loops of all words in the memory, and which are individually controlled or selected, for the purpose of interrogating the binary position including a binary 1, with the aid of pulses of the one polarity and, for the purpose of effecting the interrogation with a binary 0, with the aid of pulses of the opposite polarity, and that the loops of the association portion and of the data portion are interconnected in series via a non-linear element having a predetermined threshold value, so that in the event of a simultaneous interrogation of the *m* bit positions of the association portion of all words stored in the memory with an *m*-digit binary combination, a current will only flow in the loop of that particular word whose information content in the association portion is in agreement with the interrogation information, with the result that the information of this word as stored in the data portion, will be read out via the reading or sensing windings.

With respect to the semi-permanent memory there will result a particularly space saving embodiment when the adjacent rings are not each time connected on opposite sides by a line or circuit, but each time on the same side. In this case, of course, the definition, i.e. the punching rule, for the storing of 1 and 0 will have to be fixed in the opposite way alternating from ring-to-ring in the loop.

According to a further embodiment of the invention the associative semi-permanent memory may also be constructed in a way suitable for bilateral operation. In this case the side referred to hereinbefore as the data portion, just like the association portion, must be designed with respect to all words in a double-layer fashion, and for both groups there must be provided one set each of selection and sensing electronics with a suitable control arrangement.

Figure 2:
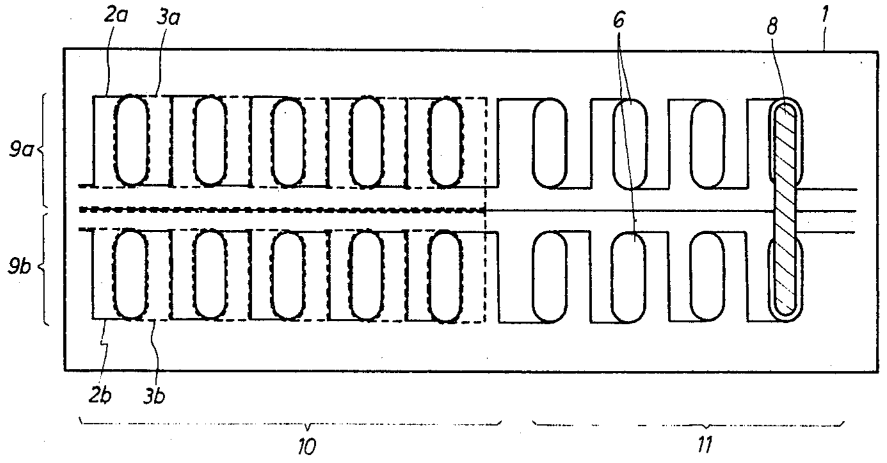
Figure 5:
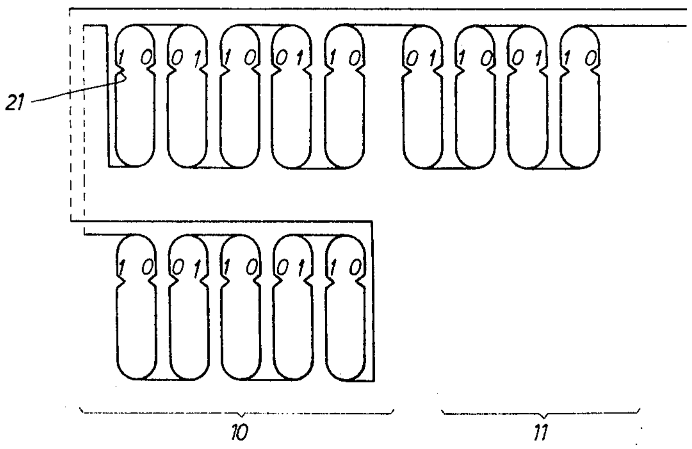
Figure 6:
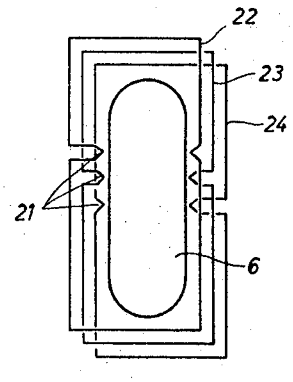
Figure 7:
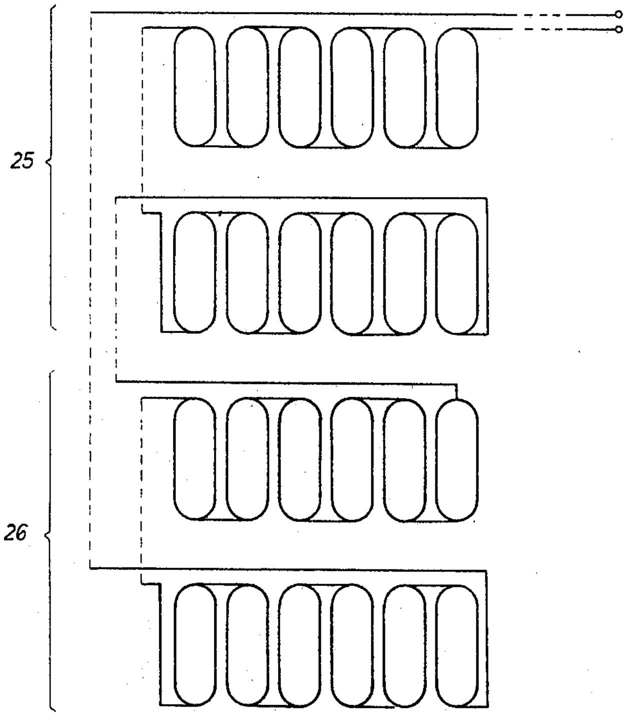

The invention will now be explained in detail with reference to examples shown in FIGS. 1 to 7 of the accompanying drawings, in which:

FIG. 1 shows one card of the memory in a sectional elevation,

FIG. 2 shows a top view of the card according to FIG. 1, showing in particular the wiring. The line conductor on the bottom layer is indicated by dash-lines, FIG. 3 shows the wiring of a complete word in which both the association portion and the data portion have already been punched, FIG. 4 schematically shows the magnetic associative semi-permanent memory including the selecting and the sensing windings, as well as the complete current loop with respect to one word, FIG. 5 shows the space-saving way of connecting the individual ring-lines among each other, FIG. 6 shows the staggering of the metal strips in neighbouring foil layers for the purpose of reducing stray capacitances, and FIG. 7 shows the use of several double layers which are connected together in such a way that loops with several windings will result.

The arrangement, which is shown both in a sectional and in a top view in FIGS. 1 and 2, serves the storing of two words (9*a* and 9*b*). The two words are lying next to each other (FIG. 2). The arrangement consists of a first printed circuit conductor 2 on a first layer of insulating material 4, and of a second printed circuit conductor 3 on a second layer of insulating material 5. At the same points, the two layers are provided with apertures (holes) 6. Through these apertures ferrite rods 7 are inserted and are joined to one another in pairs (7*a* and 7*b*) (FIG. 4) at both ends with the aid of each time one yoke 8. In FIG. 2 the lower printed circuit conductor is indicated by dash-lines. The printed circuit conductors associated with the word 9*a* on both the upper and the lower layer of insulating material are designated 2*a* or 3*a* and, accordingly, the conductors associated with the word 9*b* are designated 2*b* or 3*b* respectively. Each word comprises an association portion 10 and a data portion 11. The arrangement for one word is designed in the association portion each time in a two-layer fashion, and in the data portion in a single-layer fashion.

Figure 3:
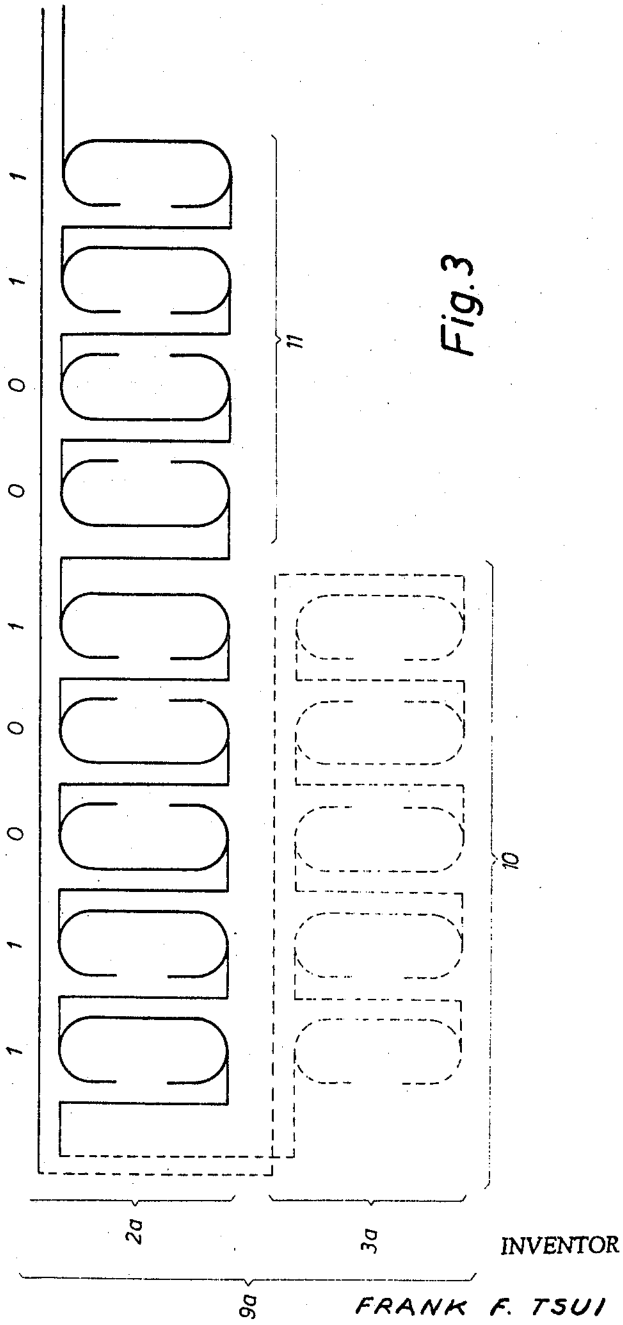

From FIG. 3 in which the printed circuit conductors in two layers lying on top of each other, are now shown next to each other, it may be taken how the circuit conductors, which are associated with one word, are connected together and punched. The metal loop serving the storing of an association portion 10, consists of printed circuit conductors 2*a* and 3*a* on two foil layers 4 and 5. For the purpose of storing the information, they are punched in such a way that for the marking of an 1 e.g. the ring on the lefthand side, and for the marking of a 0, the ring on the righthand side is interrupted. By this kind of punching it is achieved with respect to the upper circuit conductor that the inserted ferrite rod, in the case of a 1, is completely surrounded by the line or circuit loop consisting of the righthand portion of the ring, of the connecting line to the next ring, and of the return lead, whereas in the case of a punched 0 the ferrite rod is not being surrounded thereby. With respect to the lower printed circuit conductor 3*a*, however, the assignment of 1 and 0 is in the opposite sense. There, and in the case of a stored 1, the inserted ferrite rod is lying outside the line or circuit loop as resulting after the punching of 3*a*, and is lying within this loop in the case of a stored 0. The assignment with respect to the data portion 11 is the same as in the case of the upper printed circuit conductor of the association portion 10. From FIG. 3 it may also be seen that the circuit conductor of the data portion and the circuit conductors on the upper and the lower layer of insulating material in the association portion, are connected in series, thus forming one single line or circuit loop.

Figure 4:
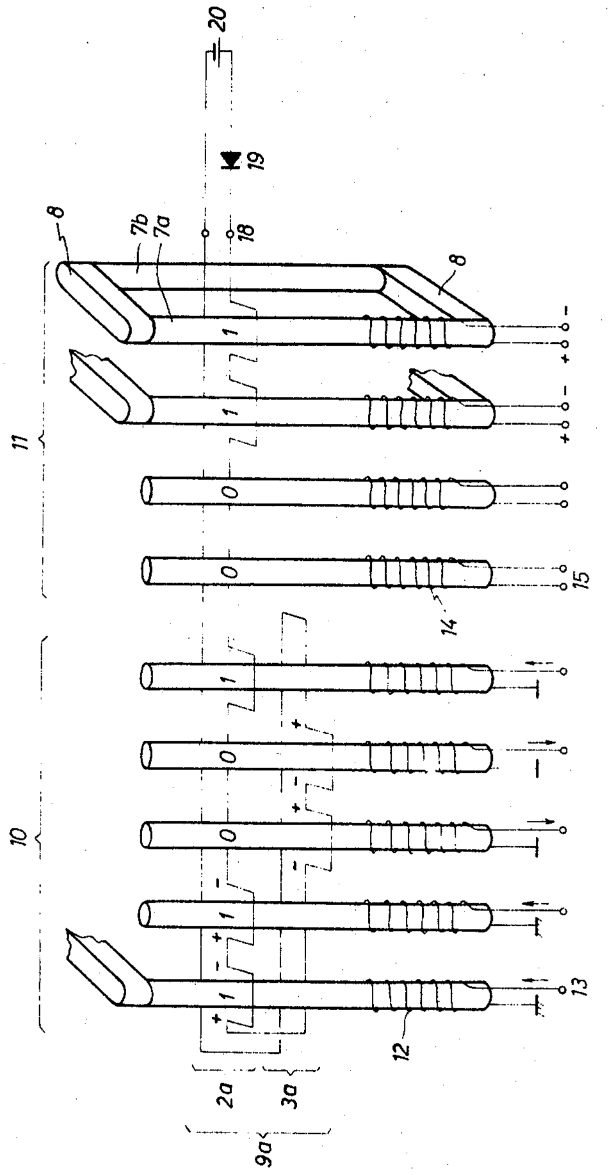

FIG. 4 shows a complete associative semi-permanent memory in a schematical representation. For the sake of clarity, FIG. 4 only shows one single word loop 9*a*, consisting of upper loop 2*a* and of a lower loop 3*a*. The association portion 10, similar as in the preceding figures, contains five bits, and the data portion 11 contains four bits. The ferrite rods 7 as extending through the holes or apertures in the association portion 10, each carry one interrogation winding 12. This winding is grounded on one side, and pulses of either the one or the other polarity may be applied to the connecting terminals 13 thereof for the interrogation purpose. The rods, as extending through the holes or apertures in the information portion (data portion) 11, carry the read windings 14, to the connecting terminals 15 of which the read amplifiers are connected. The terminals 18 of the word loop 9*a* extend via a diode 19, to a comparison or reference voltage 20. All other word loops are likewise connected to the comparison or reference voltage 20 via diodes.

Upon interrogation of the memory, current pulses are applied to all of the interrogation windings 12, and quite according to the binary value of the interrogation information at the bit position, with either the one or the other polarity. In each loop portion, an interrogation pulse will cause at each bit position in the association portion of the word loops a pulse voltage U, the polarity of which is dependent upon the polarity of the interrogation voltage, and upon the punching of the bit position. With respect to one individual bit position there will result the relationship between interrogation pulse and punching as shown in Table I.

TABLE I

| | Ring-line punched for | Induced voltage in the word loop |
|---|---|---|
| Interrogation with a binary value pulse: | | |
| $1=+U_0$ | 1 | $+U$ |
| $1=+U_0$ | 0 | $-U$ |
| $0=-U_0$ | 1 | $-U$ |
| $0=-U_0$ | 0 | $+U$ |

It should be pointed out again, that the punching in the upper portion of the correlation part is chosen thus that no signal will result from a binary 0, and is chosen in such a way in the lower part, that no signal will result from the binary or vice versa.

In FIG. 4 there is shown the case in which there is an agreement between the interrogation information and the information as stored in the association portion, and in both cases there is involved 11001. From FIG. 4 it may be seen that the voltages as induced in both the upper and the lower part of the association portion, are added to one another, and that there will result a total voltage $m.U$.

Quite depending on the degree of coincidence (agreement) between the interrogation pulse and the stored bits, the following voltages will result on the word loops in the case of a parallel interrogation of the memory: $-m.U$, $-(m-2)U$, $-(m-4)U$, . . . $+(m-4)U$, $+(m-2).U$ or $+m.U$, respectively.

The last $+m.U$ will result, as shown above, only once, i.e. only in the word loop whose association portion is in complete agreement with the interrogation information. The blocking voltage 20, which extends in the opposite sense and in series with the induced voltages in the word loops, is fixed at $(m-2).U-U_d$, wherein $U_d$ is the initial value of the forward voltage of diode 19. When forming the sum of the above-mentioned voltages and of the blocking voltage, the following will result with respect to the possible voltages as appearing in the word loops: $(-2m+2)U+U_d-2mU+U_d$ . . . $2U+U_d$, $U_d$ or $+2U+U_d$ respectively. The last voltage value $2U+U_d$ will appear in the case of a complete agreement, i.e. when the voltage $+m.U$ is induced, and a pulse current can only flow over the diode in that particular word loop in which this voltage is induced. As soon as this current flows, output voltages are induced in the read windings 14 corresponding to the binary values as stored in the data portion.

Briefly, the mode of operation of the associative semi-permanent memory may be explained as follows: both the punching of the binary values in the two planes of the association portion and the opposite voltage 20 are adapted in such a way to one another that a current can only flow in that particular word loop in which there has been established a complete agreement or coincidence with the offered interrogation binary values, with the information as stored in the data portion being read out by this current. The voltage spacing between the association portion which is exactly in agreement, and an association portion which is only at one bit position not in agreement, amounts to 2U.

FIG. 5 shows a modification of the circuit pattern as shown in FIGS. 2 and 3. In FIGURES 2 and 3 the connecting line extending between the individual ring-shaped lines is led each time from the high point of the first (lefthand) ring-shaped line to the low point of the second (righthand) ring-shaped line. This connecting mode requires relatively much space so that it is not possible to arrange the individual ring-shaped lines closely next to each other. In the arrangement according to FIG. 5 this connecting lead extending between the two ring-shaped lines is omitted. Instead of this each time the ring-shaped lines lying next to each other are connected to one another at their high points or low points respectively. On account of this arrangement it becomes possible to arrange the ring-shaped lines directly next to one another. Of course, this requires a different punching rule for storing the 1 or 0 respectively. In FIGS. 2 and 3 the lefthand portion of the ring-shaped line is interrupted when a 1 is supposed to be punched, and the righthand portion of the ring-shaped line is interrupted whenever a 0 is supposed to be punched. The order of succession in the meaning of the punching points, when seen from left to the right, is 1010 etc. In the arrangement according to FIG. 5, however, the meaning of the punching points in each ring-shaped line is exchanged with respect to the neighbouring ones, and vice versa, in other words, the order of succession is now 10011001 . . . etc. In FIG. 5 the punching points are indicated by the reference 21.

FIG. 6 shows how the circuit conductors can be staggered with respect to one another on stacked foil layers for reducing their mutual stray-capacitive interferences. Of course, the two bottom layers may only be staggered to such an extent that the ring-shaped lines 23 and 24 will not yet come to lie within the hole or aperture 6.

FIG. 7, finally, shows how several double layers can be used and connected together, in order to form a loop with more than one winding. The upper double layer is indicated by the reference numeral 25, and the lower double layer is indicated by the reference numeral 26.

The magnetic associative semi-permanent memory may also be constructed for serving a bilateral mode of operation. In this case the word loop must be designed in a double-layer fashion at all of the bit positions, and the windings on the ferrite rods must serve the interrogation as well as the read out, in other words, the windings must each be provided with an interrogation current pulse transmitter and a sense amplifier (read amplifier).

What is claimed is:

1. In a magnetic associative semi-permanent memory in which each word consists of an association portion having *m* bit positions, and of a data portion having *n* bit positions, and in the data portion, the value 1 or 0 of each binary position is indicated by either the presence or absence of an inductive coupling between a first and a second winding, the first winding being metal strips on a punchable memory card and includes an interconnection of the ring-lines enclosing one aperture and of a return lead, the individual ring-lines, when used for storage, are punched so that the loop portion, with respect to one bit position, consists of an interrupted ring line and of the return lead, which surrounds the aperture associated with the bit position or bypasses it, and the second winding being a cylindrical coil inserted through the aperture and representing a sensing line provided in common to the corresponding bits of all words, and in which the data portion, the loop parts, including ring-lines and return leads of all bits are series connected and constitute a line loop circuit, the improvement comprising:

the association portion having two partial loops on two superposed foil layers which are similar to the foil layers of the data portion, said two partial loops are interconnected so that the loop portion resulting subsequently to the punching, in the one plane when storing a 1 and in the other plane when storing a 0, will enclose the aperture, and in the opposite case will extend past this aperture, the total loop at the individual bit positions, when storing a 1 is coupled in the one sense and when storing a 0 in the opposite sense to the cylindrical coil as inserted through the aperture;

the cylindrical coils in the association portion act as selection windings extending through the association loops of all words in the memory and are individually selected for interrogating the binary position including a binary 1 with pulses of the one polarity, and with a binary 0 with pulses of the opposite polarity;

the loops of the association portion and of the data portion are interconnected in series by a non-linear element having a predetermined threshold value, so that in the event of a simultaneous interrogation of the *m* bit positions of the association portion of all words stored in the memory with an *m*-digit binary combination, a current will only flow in the loop of that particular word whose information content in the association portion is in agreement with the interrogation information, causing the information of this word as stored in the data portion to be read out by the reading windings;

the word loop at all bit positions is designed in a double-layer fashion, and the windings on said ferrite rods provide interrogation and read out; and the connecting lead extending between the ring-shaped lines lying next to each other in a word loop connect the high point of the one and the low point of the other ring-shaped line, so that the meaning of the punching points for marking a 1 or a 0 is the same with all ring-shaped lines.

2. A memory according to claim 1 wherein the operating voltage of the non-linear element is determined by an opposite voltage of the magnitude $(m-2)\ U-U_d$ ($m$=number of bit positions in the association portion, U=voltage as induced in a loop portion by the interrogation pulse, $U_d$—initial value of the forward voltage of said non-linear element).

References Cited

UNITED STATES PATENTS

| | | | |
|---|---|---|---|
| 3,234,529 | 2/1966 | Hsueh | 340—174 |
| 3,299,412 | 1/1967 | Pick | 340—174 X |
| 3,339,184 | 9/1967 | Pick | 340—174 X |

STANLEY M. URYNOWICZ, Jr., Primary Examiner